(12) United States Patent
Miyamoto et al.

(10) Patent No.: US 8,557,352 B2
(45) Date of Patent: Oct. 15, 2013

(54) METHOD OF MAKING A METAL OXIDE FILM, LAMINATES AND ELECTRONIC DEVICES

(75) Inventors: Yuki Miyamoto, Tokyo (JP); Tetsuo Tsuchiya, Tsukuba (JP)

(73) Assignees: TDK Corporation, Tokyo (JP); National Institute of Advanced Industrial Science and Technology, Tokyo (JP)

(*) Notice: Subject to any disclaimer, the term of this patent is extended or adjusted under 35 U.S.C. 154(b) by 682 days.

(21) Appl. No.: 11/812,506

(22) Filed: Jun. 19, 2007

(65) Prior Publication Data

US 2008/0044673 A1 Feb. 21, 2008

(30) Foreign Application Priority Data

Jun. 20, 2006 (JP) .............................. P2006-170232

(51) Int. Cl.
| | | |
|---|---|---|
| *B05D 3/00* | (2006.01) | |
| *B05D 3/06* | (2006.01) | |
| *B05D 3/02* | (2006.01) | |
| *C08J 7/18* | (2006.01) | |
| *C23C 14/28* | (2006.01) | |

(52) U.S. Cl.
USPC ........... 427/553; 427/557; 427/558; 427/559; 427/595

(58) Field of Classification Search
USPC .......................... 427/553, 557, 558, 559, 595
See application file for complete search history.

(56) References Cited

U.S. PATENT DOCUMENTS

| | | | | |
|---|---|---|---|---|
| 5,310,990 A | * | 5/1994 | Russell et al. | ........... 219/121.69 |
| 5,631,463 A | | 5/1997 | Kawasaki et al. | |
| 5,739,563 A | * | 4/1998 | Kawakubo et al. | ........... 257/295 |
| 5,871,853 A | * | 2/1999 | Azuma et al. | ................. 428/689 |
| 6,955,925 B1 | * | 10/2005 | Donohue et al. | ................... 438/3 |

FOREIGN PATENT DOCUMENTS

| | | |
|---|---|---|
| JP | A 5-247658 | 9/1993 |
| JP | A-6-132579 | 5/1994 |
| JP | A 6-140385 | 5/1994 |
| JP | A 9-157855 | 6/1997 |
| JP | A-09-219587 | 8/1997 |
| JP | A-09-326331 | 12/1997 |
| JP | B2 2834355 | 10/1998 |
| JP | B2 2916116 | 4/1999 |
| JP | A-2003-081694 | 3/2003 |
| JP | B2 3608459 | 10/2004 |
| JP | A-2005-255424 | 9/2005 |
| WO | WO 2004/070748 A1 | 8/2004 |

OTHER PUBLICATIONS

Takayama R. et al., Preparation of Epitaxial $Pb(Zr_xTi_{1-x})O_3$ Thin Films and Their Crystallographic, Pyroelectric, and Ferroelectric Properties, 1989, J. Appl. Phys., vol. 65, pp. 1666-1670.

\* cited by examiner

*Primary Examiner* — Michael Cleveland
*Assistant Examiner* — Michael Wieczorek
(74) *Attorney, Agent, or Firm* — Oliff & Berridge, PLC (57) ABSTRACT

An object is to provide a method of making a metal oxide film with a sufficiently high degree of crystal orientation, without difficulties, at low cost, and with little damage to a base material and the metal oxide film, and to provide laminates and electronic devices using the same. A method includes a step of forming a metal film having a (111) plane, on a base material; a step of forming a metal oxide film on the (111) plane of the metal film; and a step of maintaining a temperature of the metal oxide film formed on the (111) plane of the metal film, at 25-600° C. and irradiating the metal oxide film with UV light.

5 Claims, 9 Drawing Sheets

| | | PROCESS OF EACH METAL OXIDE FILM | | | | | | TOTAL DEPOSITION NUMBER OF METAL OXIDE FILM | DEGREE OF CRYSTAL ORIENTATION F OF METAL OXIDE FILM AFTER PROCESS |
|---|---|---|---|---|---|---|---|---|---|
| | TYPE OF PROCESS | METAL OXIDE FILM | TEMPERATURE OF METAL OXIDE FILM (°C) | REPETITION RATE (Hz) | ENERGY PER PULSE (mJ/cm²) | TOTAL PULSE NUMBER | | | |
| EXAMPLE 1 | UV PULSED LASER IRRADIATION | BaTiO₃ | 400 | 10 | 70 | 1000 | | 1 | 2.4 |
| EXAMPLE 2 | UV PULSED LASER IRRADIATION | BaTiO₃ | 400 | 10 | 70 | 2000 | | 1 | 3.2 |
| EXAMPLE 3 | UV PULSED LASER IRRADIATION | BaTiO₃ | 400 | 10 | 70 | 3000 | | 1 | 2.7 |
| EXAMPLE 4 | UV PULSED LASER IRRADIATION | BaTiO₃ | 400 | 10 | 70 | 4000 | | 1 | 3.6 |
| EXAMPLE 5 | UV PULSED LASER IRRADIATION | BaTiO₃ | 400 | 10 | 70 | 6000 | | 1 | 2.3 |
| EXAMPLE 6 | UV PULSED LASER IRRADIATION | (Ba,Sr)TiO₃ | 300 | 30 | 80 | 1000 | | 1 | 2.9 |
| EXAMPLE 7 | UV PULSED LASER IRRADIATION | (Ba,Sr)TiO₃ | 300 | 30 | 90 | 1000 | | 1 | 5.9 |
| EXAMPLE 8 | UV PULSED LASER IRRADIATION | BaTiO₃ | 400 | 10 | 70 | 1000 | | 2 | 3.5 |
| COMPARATIVE EXAMPLE 1 | FIRING | BaTiO₃ | 800 | — | — | — | | 2 | 0.3 |

METHOD OF MAKING A METAL OXIDE FILM, LAMINATES AND ELECTRONIC DEVICES

BACKGROUND OF THE INVENTION

1. Field of the Invention

The present invention relates to a method of making a metal oxide film, and to laminates and electronic devices.

2. Related Background Art

There have been demands for formation of a metal oxide film with a high degree of crystal orientation on a base material such as an electrode film, in manufacture of electronic devices and others. Examples of metal oxides to be used are metal oxides containing Ba and Ti ($BaTiO_3$ and others), for example.

The known methods of forming the metal oxide film with a high degree of crystal orientation on the base material include methods of epitaxially growing the metal oxide film on a single-crystal substrate, or on a buffer film or an electrode film with a high degree of crystal orientation (e.g., cf. Japanese Patents No. 3608459, No. 2834355, and No. 2916116, J. Appl. Phys., Vol. 65, (1989), pp 1666-1670, and so on). There are also known methods of depositing the metal oxide film on the base material kept at 600° C. or higher, by sputtering. Furthermore, it is also known that an amorphous metal oxide film made by CVD or by the sol-gel method is irradiated with ultraviolet (UV) or laser light to be crystallized (e.g., cf. Japanese Patent Applications Laid-open No. 6-140385, Laid-open No. 9-157855, and Laid-open No. 5-247658, and so on).

SUMMARY OF THE INVENTION

However, the single-crystal substrate is expensive, and it is also difficult to obtain the electrode film or the buffer film with a high degree of crystal orientation. The deposition of the metal oxide on the base material under the high temperature of not less than 600° C. could lead to damage to a laminate including the base material and the metal oxide film, due to oxidation of the base material, the difference between the thermal expansion coefficients of the base material and the metal oxide film, and so on; this narrows a choice of base materials and thus results in decreasing potentials of devices. Furthermore, it is difficult to obtain the metal oxide film with a sufficiently high degree of crystal orientation, by simply irradiating the amorphous metal oxide film with UV or laser light.

The present invention has been accomplished in view of the above-stated problems and an object of the present invention is to provide a method of preparing a metal oxide film with a sufficiently high degree of crystal orientation, without difficulties, at low cost, and with little damage to the base material and the metal oxide film, and to provide laminates and electronic devices using the same.

A method of making a metal oxide film according to the present invention is a method comprising: a step of forming a metal film having a (111) plane, on a base material; a step of directly forming a metal oxide film on the (111) plane of the metal film; and a step of maintaining a temperature of the metal oxide film at 25-600° C. and irradiating the metal oxide film with UV light.

According to the present invention, the degree of crystal orientation of the metal oxide film can be sufficiently enhanced regardless of kinds of base materials. Since the temperature is not so high, the method is unlikely to damage the base material and the metal oxide film.

Preferably, the metal oxide film is a metal oxide film containing Ba and Ti. Particularly, the metal oxide film is preferably a perovskite-type metal oxide film. In this case, particularly, the (100) plane can be preferentially oriented in parallel with a film plane, in the metal oxide film.

A wavelength of the UV light is preferably 100-500 nm. The UV light is preferably laser light. Particularly, the UV light is preferably pulsed laser light.

An energy of the pulsed laser light is preferably 40-400 $mJ/cm^2$ per pulse and more preferably 60-300 $mJ/cm^2$ per pulse.

A repetition rate of the pulsed laser light is preferably 1-1000 Hz and more preferably 1-100 Hz.

A laminate according to the present invention comprises: a metal film having a (111) plane; and a metal oxide film laid directly on the (111) plane of the metal film; wherein a peak intensity ratio (I(100)/I(110)) is not less than 2, preferably not less than 2.1, and more preferably not less than 2.2, where I(100) is a (100) peak intensity of a X-ray diffraction pattern of the metal oxide film and I(110) is a (110) peak intensity of a X-ray diffraction pattern of the metal oxide film. The above-mentioned peak intensity ratio is defined as a degree of crystal orientation F.

The laminate as describe above is readily fabricated by the aforementioned method.

In this laminate, the metal oxide film is preferably a metal oxide film containing Ba and Ti.

An electronic device according to the present invention is an electronic device comprising the foregoing laminate.

The present invention permits the metal oxide film with a sufficiently high degree of crystal orientation to be made without difficulties, at low cost, and with little damage to the base material.

DESCRIPTION OF THE PREFERRED EMBODIMENTS

A method of making a metal oxide film, and a laminate according to an embodiment of the present invention will be describe below with reference to FIG. 1.

First, a base material 10 is prepared. There are no particular restrictions on the base material 10, and it may be a monolayer base material or a multilayer laminate base material. For example, the base material applicable herein can be a substrate of a single-crystal material, a polycrystalline material, an amorphous material, or the like. There are no particular restrictions on the composition of the substrate, either, and examples thereof include semiconductor substrates of Si, GaAs, GaP, InP, SiC, etc., metal oxide substrates of $SiO_2$, $Al_2O_3$, MgO, $SrTiO_3$, etc., metal substrates of Cu, Ni, etc., ceramic substrates of LTCC (Low Temperature Co-fired Ceramics), alumina, etc., and so on.

The base material 10 can also be one obtained by forming one or more layers of ground films, such as metal oxide films of MgO, ITO, ZnO, $SnO_2$, etc., and metal films of Au, Pt, Ag, Ir, Ru, Co, Ni, Fe, Cu, Al, etc., on the substrate as described above. These ground layers can be readily formed by oxidation of the substrate itself, sputtering, or the like.

Figure 1:
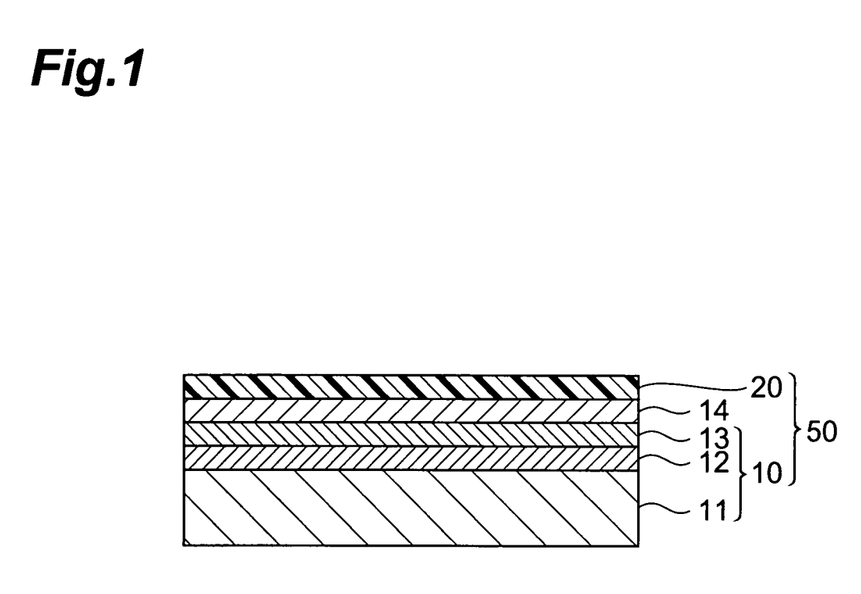
FIG. 1 is a schematic sectional view for explaining a method of making a metal oxide film according to an embodiment of the present invention.

Specifically, the base material 10 is preferably, for example, one in which a metal oxide film 12 of $SiO_2$ or the like and a metal oxide film 13 of $TiO_2$ or the like as buffer films, are laid on a semiconductor substrate 11 of Si or the like, as shown in FIG. 1. The $SiO_2$ film can be formed by exposing the Si substrate to high temperature in an oxidizing atmosphere. The $TiO_2$ film can be formed by sputtering or the like.

Subsequently, a metal film 14 having a (111) plane oriented is formed on the surface of the base material 10. The metal film 14 having the (111) plane oriented in the surface can be readily obtained, for example, by forming a metal film of Pt, Ni, Cu, or the like in the thickness of about 0.01-30 μm on the surface of the base material 10 by sputtering or the like.

Next, a metal oxide film 20 is directly formed on the (111) plane of the metal film 14. There are no particular restrictions on the composition of the metal oxide, but the metal oxide is preferably a metal oxide containing Ba and Ti, for example, barium titanate (BT), barium strontium titanate (BST), or the like.

There are no particular restrictions on a method of forming the metal oxide film 20. For example, the metal oxide film 20 can be made by a so-called chemical solution method, i.e., a method of applying a solution containing a metal alkoxide, a metal-organic acid salt, an inorganic metal salt, etc., onto the metal film 14, for example, by spin coating, evaporating a solvent by drying, and calcining the resultant to decompose the metal alkoxide, the metal-organic acid salt, the inorganic metal salt, and so on. Examples of metal compounds as raw materials include metal alkoxides (e.g., $Ti(OC_2H_5)_4$, $Ba(OC_2H_5)_2$, $Zr(OC_2H_5)_4$, $Pb(OC_2H_5)_2$, $Sr(OC_2H_5)_2$, and so on), organic acid-metal salts (e.g., barium 2-ethly hexanoate, zirconium 2-ethly hexanoate, titanium 2-ethly hexanoate, lead 2-ethly hexanoate, strontium 2-ethly hexanoate, laurates, acetylacetonates, etc.), and so on, and examples of the inorganic metal salts include metal nitrates (e.g., $Ba(NO_3)_2$ and $Sr(NO_3)_2$), metal acetates (e.g., $Ba(CH_3COO)_2 \cdot H_2O$ and $Pb(CH_3COO)_2 \cdot 3H_2O$), metal carbonates ($BaCO_3$ and $SrCO_3$), and so on.

The metal oxide film 20 may also be made by a so-called vapor phase method such as a sputtering method using a metal oxide as a target, CVD, or a laser ablation method. A film-forming temperature in this case is preferably from room temperature to 500° C.

The thickness of the metal oxide film 20 is preferably, for example, 0.01-30 μm

The metal oxide film 20 formed as described above is in an amorphous state with a nearly zero degree of crystal orientation, or even if it has crystal orientation, the degree thereof is vary low and it usually fails to exhibit a sufficient resistivity demanded for dielectrics of various electronic devices.

Subsequently, this metal oxide film 20 is maintained at about 25-600° C. and preferably at about 25-500° C. and in this state this metal oxide film 20 is irradiated with UV light. The wavelength of the UV light is, for example, 100-500 nm and preferably 100-400 nm. The UV light is preferably laser light such as ArF (193 nm), XeCl (308 nm), or KrF (248 nm). Among the laser beams, the laser light is preferably pulsed laser light. The energy per pulse is preferably 40-400 $mJ/cm^2$ and the repetition rate (the number of pulses applied in one second) is preferably approximately 1-100 Hz. An irradiation duration of one pulse can be, for example, 10-100 ns. The total number of pulses to be applied to each site on the metal oxide film can be, for example, 5-50000.

Figure 2:
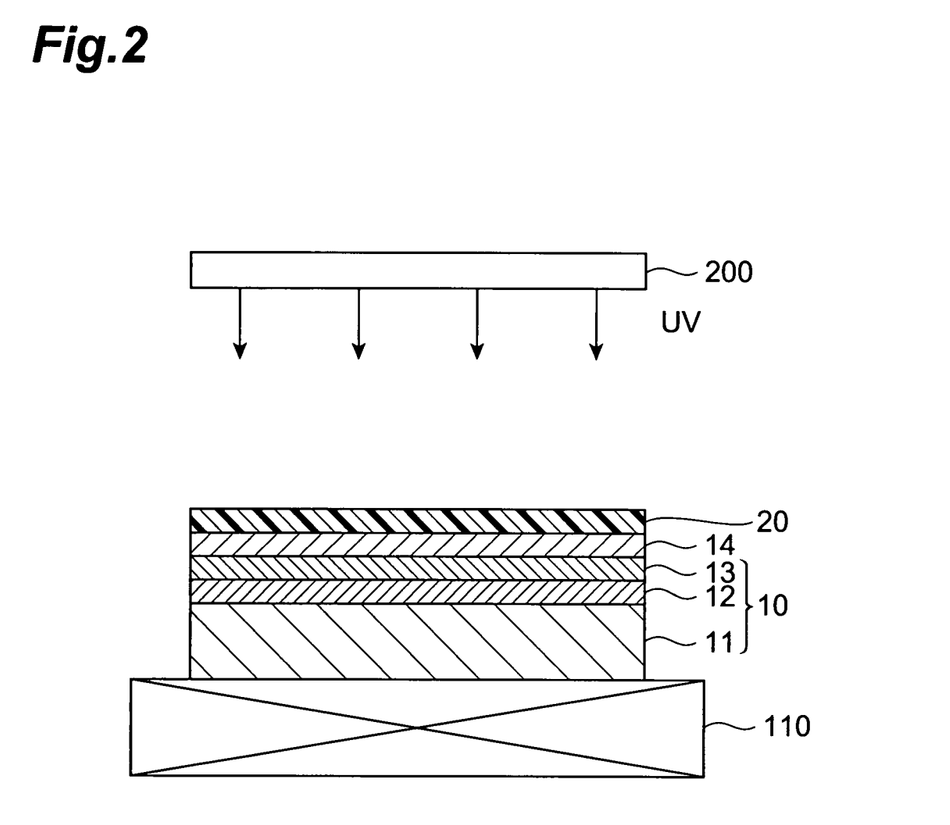
FIG. 2 is a schematic sectional view subsequent to FIG. 1 for explaining the method of preparing the metal oxide film according to the embodiment of the present invention.

Specifically, for example, an apparatus as shown in FIG. 2 can be used. The base material 10 is placed on a heating stage 110, the metal oxide film 20 on the base material 10 is maintained at 25-500° C., and this metal oxide film 20 is irradiated with laser light from a laser light source 200.

Implementation can also be achieved with continuous light, instead of the pulsed light, and it is also possible to achieve the implementation by irradiation with light from a UV lamp such as a mercury lamp, instead of the laser light. It is needles to mention that the metal oxide film 20 may be heated by any apparatus other than that shown in FIG. 2.

When the metal oxide is irradiated with UV under the above-described temperature condition, the degree of crystal orientation of the metal oxide film 20 is remarkably improved.

Particularly, in a case where the surface of the metal film 14 is the (111) plane, where the metal oxide film 20 is directly formed on the (111) plane of this metal film 14, and where the metal oxide film 20 is the film made of the metal oxide containing Ba and Ti, the (100) plane of the metal oxide can be particularly preferentially oriented in parallel with the film plane by the UV irradiation under the aforementioned temperature condition, which is particularly preferred. Specifically, where I(100) represents a (100) peak intensity of a X-ray diffraction patterns of the metal oxide film 20 and I(110) represents a (110) peak intensity of a X-ray diffraction pattern of the metal oxide film, the degree of crystal orientation F, i.e., peak intensity ratio F=(I(100)/I(110)) is readily made not less than 2. We have never obtained a laminate 50 with the metal film 14 and the metal oxide film 20 of this structure. The diffraction line of the (100) plane in the X-ray diffraction chart may be one indexed as a pseudo-cubic crystal. The pseudo-cubic crystal means a crystalline state in which the difference is small between the lattice constants of the (100) plane and the (001) plane and they can hardly be separated by analysis based on X-ray diffraction. The thickness of the metal film 14 is preferably approximately 0.01-500 μm.

Figure 3:
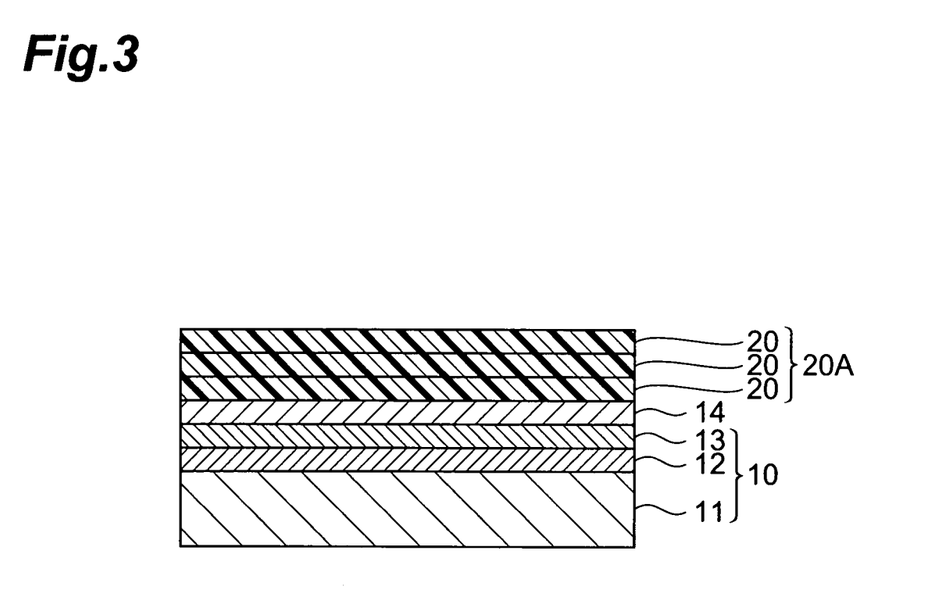
FIG. 3 is a schematic sectional view for explaining a method of preparing a metal oxide film according to an embodiment of the present invention.

A relatively thick metal oxide film 20A may be formed by repeating a plurality of sequences of steps including the step of forming the metal oxide film and the step of processing the metal oxide by the UV irradiation while maintaining it at the predetermined temperature as described above, so as to deposit a large number of metal oxide films 20 with an excellent degree of crystal orientation as shown in FIG. 3.

Figure 4:
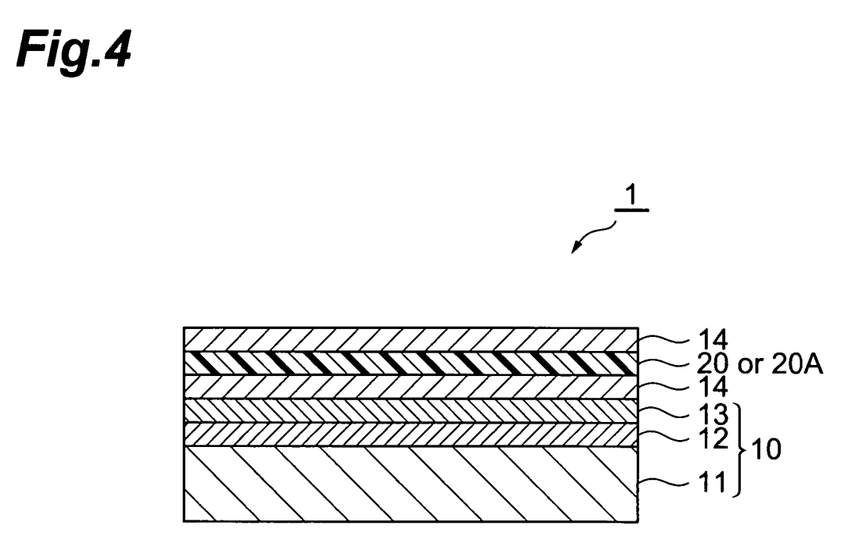
FIG. 4 is a schematic sectional view for explaining an electronic device according to an embodiment of the present invention.
Figure 5:
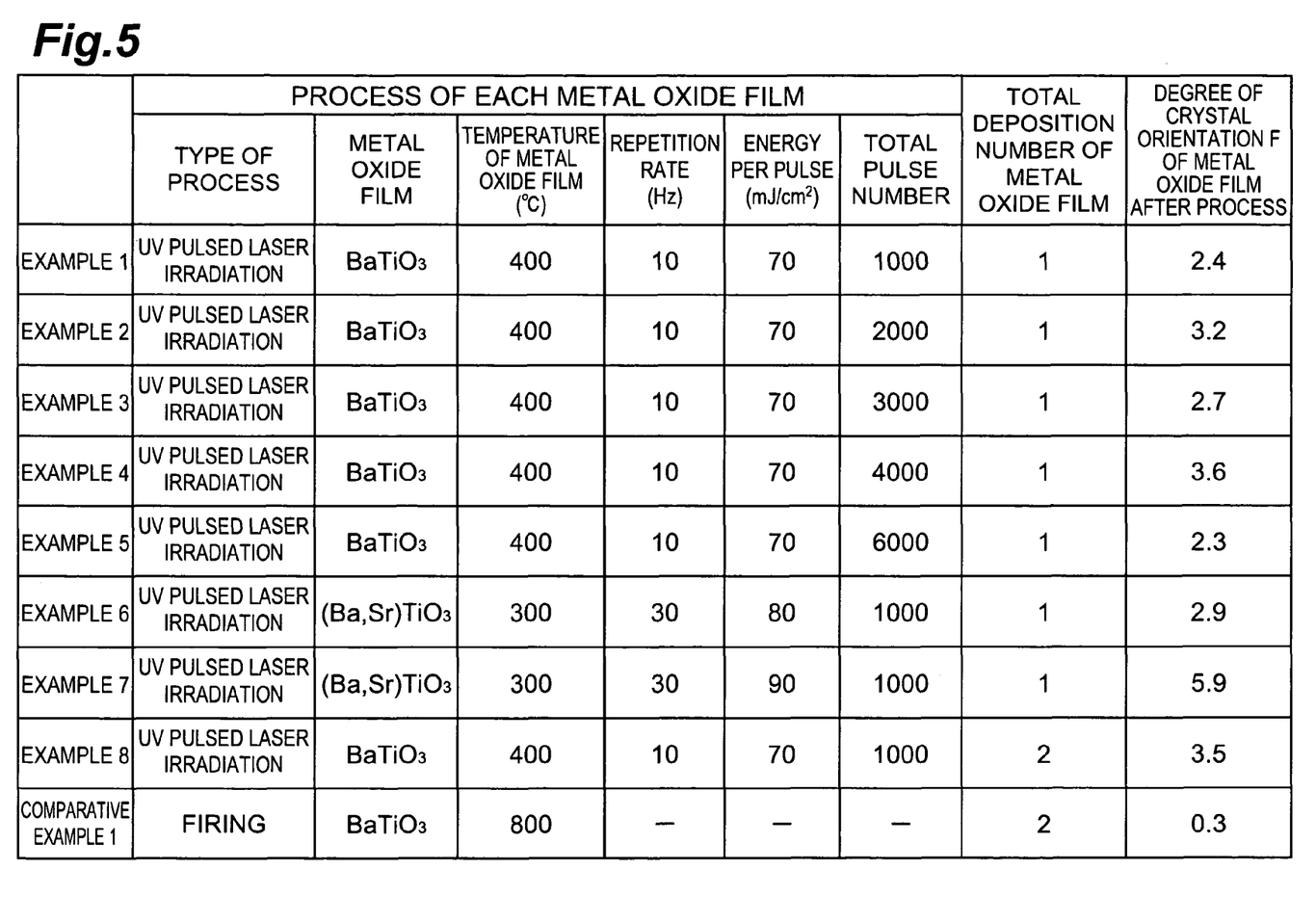
FIG. 5 is a table showing methods of making metal oxide films in Examples 1-8 and Comparative Example 1, and the results thereof.

Subsequently, a thin-film capacitor element 1 having the metal oxide film 20 as a dielectric film will be described below in detail with reference to FIG. 4, as an example of electronic devices using the metal oxide film obtained in this manner.

This thin-film capacitor element 1 is an element obtained by forming a metal oxide film 12 of $SiO_2$ or the like and a metal oxide film 13 of $TiO_2$ or the like as buffer (contact) layers on a substrate 11 of Si or the like, forming a metal film (electrode film) 14 of Au, Pt, Ag, Ir, Ru, Co, Ni, Fe, Cu, Al, or the like, forming a metal oxide layer 20 or 20A, and further forming another metal film 14 as an electrode on the metal oxide film 20 or 20A.

The thickness of the substrate 11 can be, for example, 0.1-5 mm; the thickness of the buffer layers, for example, 5-2000 nm; the thickness of the metal films 14, for example, 0.01-500 μm; the thickness of the metal oxide film 20 or 20A, for example, 100-1000 nm.

Since the thin-film capacitor element 1 of this configuration has the metal oxide film 20 with a high degree of crystal orientation, it can exhibit suitable performance even with the small thickness of the metal oxide film 20. An electronic device having the laminate of the structure in which the metal oxide film 20 of the above-described configuration is sandwiched between a pair of metal films 14, is not applicable only to thin-film capacitors but are also applicable to such devices as FeRAM and tunable filters.

EXAMPLES

The present invention will be described below in further detail with specific examples. It is, however, noted that the present invention is by no means intended to be limited to the examples below.

Example 1

First, a base material was prepared. A $TiO_2$ film was first formed in the thickness of 20 nm on a polycrystalline Si substrate with a thermally oxidized film of 500 nm on its surface by sputtering, and then a Pt film was formed in the thickness of 200 nm on the $TiO_2$ film by sputtering. The surface of the Pt film was oriented as a (111) plane.

Subsequently, a metal compound raw liquid containing 7-wt % Ti and Ba for formation of a barium titanate film was applied onto the Pt film by a spin coater (3000 rpm; 15 sec), it was dried at 150° C. on a hot plate for 10 minutes, and thereafter it was calcined at 400° C. on the hot plate for 10 minutes to form an almost amorphous barium titanate film (about 110 nm thick) as a metal oxide film on the Pt film.

Next, while the metal oxide film was maintained at 400° C. on the hot plate, it was irradiated at each site with a UV pulsed laser from a KrF pulsed laser source so as to achieve the irradiation energy per pulse of 70 mJ/cm$^2$, the total pulse number of 1000, and the repetition rate (the number of pulses applied in one second) of 10 Hz, and thereafter the metal oxide film was cooled down to room temperature.

Examples 2-5

Examples 2-5 were prepared in the same manner as Example 1, except that the total pulse number was changed to 2000, 3000, 4000, or 6000, respectively.

Examples 6 and 7

Examples 6 and 7 were prepared in the same manner as Example 1, except that a (Ba, Sr) $TiO_3$ film (about 120 nm thick) was formed in place of the barium titanate film, the temperature during the laser irradiation of the metal oxide film was 300° C., the repetition rate of the UV pulsed laser was 30 Hz, and the energy of one pulse was 80 mJ/cm$^2$ in Example 6 or 90 mJ/cm$^2$ in Example 7. A molar element ratio of Ba and Sr in the metal oxide film was 7:3.

Example 8

Example 8 was prepared in the same manner as Example 1, except that the steps including the formation of the metal oxide film and the UV irradiation process under the predetermined temperature condition for the metal oxide were repeated twice in total.

Comparative Example 1

A metal oxide film was made in the same manner as in Example 1, except that the UV irradiation was not conducted and that the metal oxide film was further heated at 800° C., after the calcination.

Figure 6:
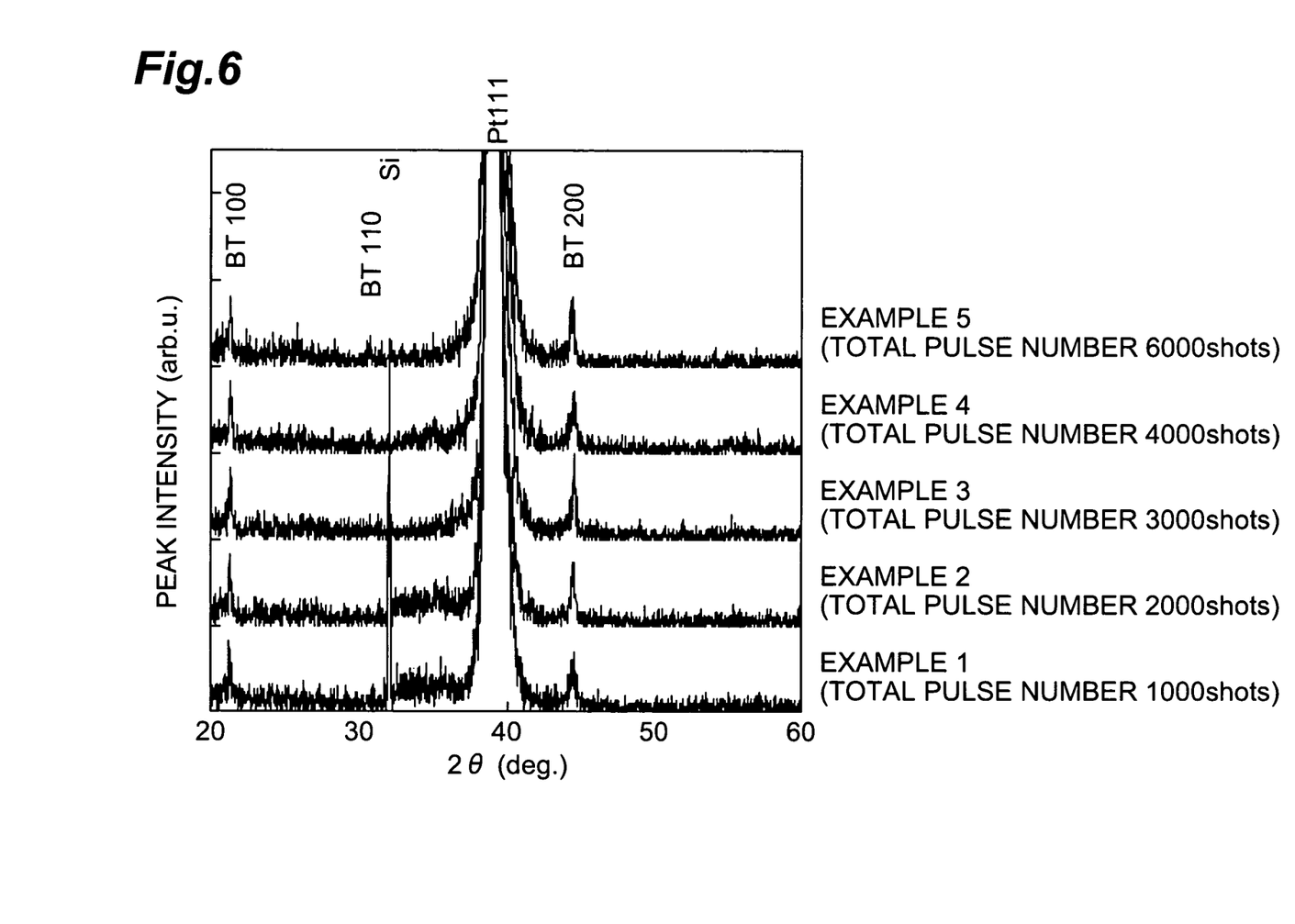
FIG. 6 is X-ray diffraction patterns of the metal oxide films in Examples 1-5.
Figure 7:
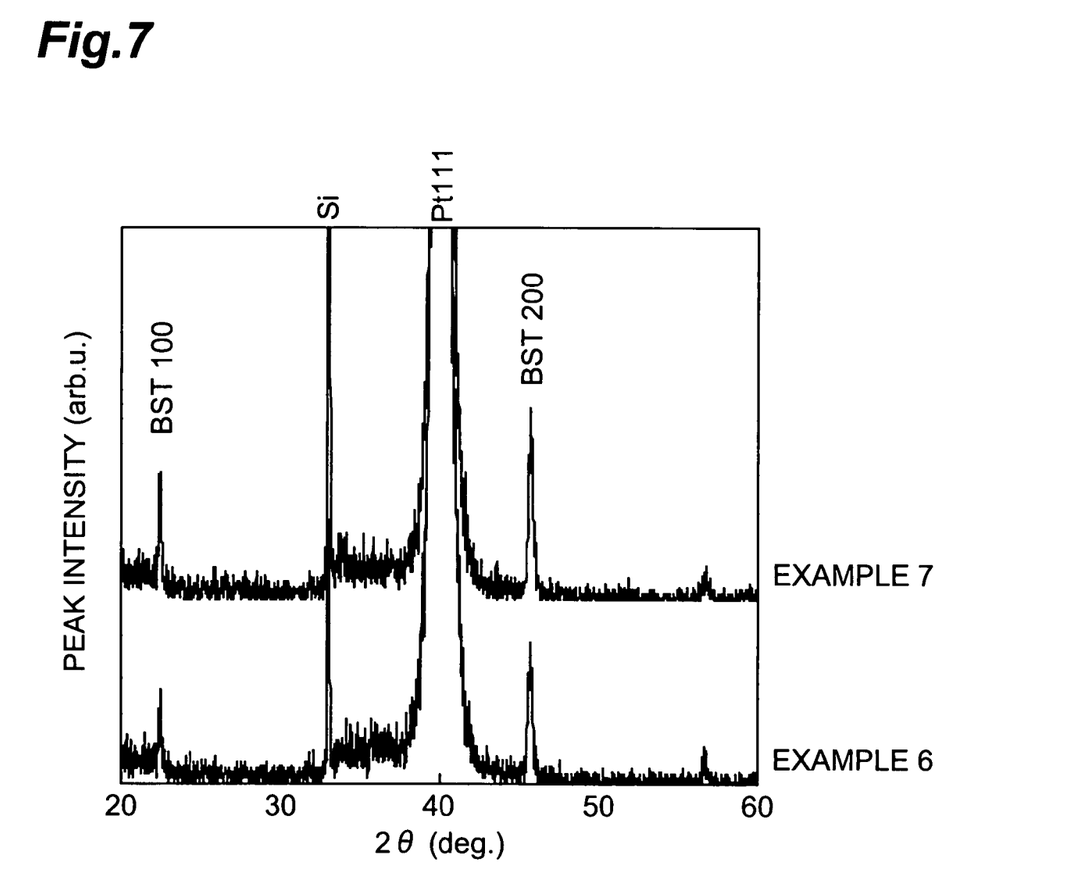
FIG. 7 is X-ray diffraction patterns of the metal oxide films in Examples 6 and 7.
Figure 8:
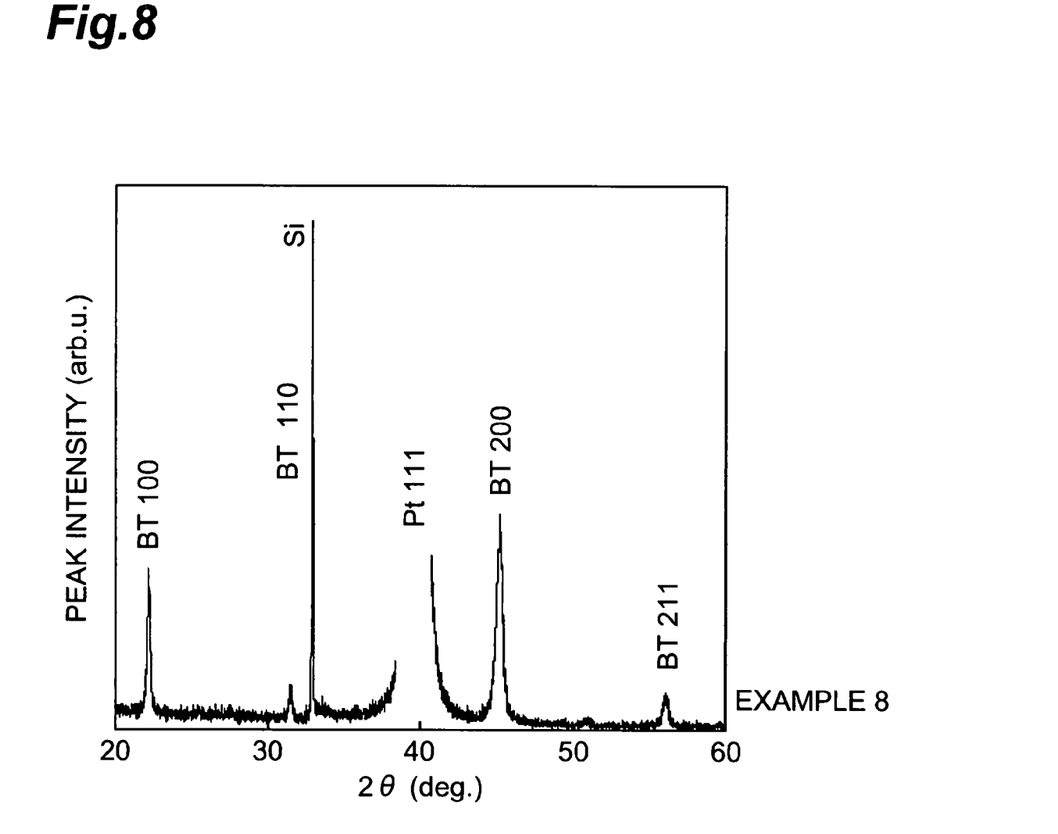
FIG. 8 is an X-ray diffraction patterns of the metal oxide film in Example 8.
Figure 9:
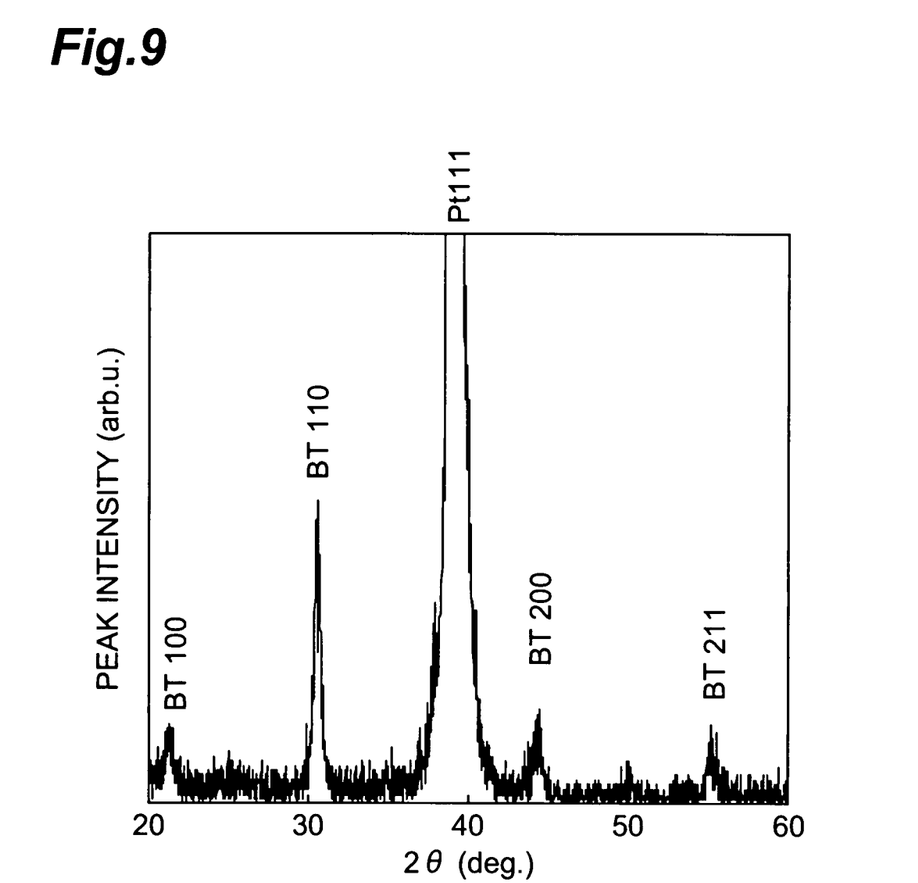
FIG. 9 is an X-ray diffraction patterns of the metal oxide film in Comparative Example 1.

FIG. 6 shows X-ray diffraction patterns of the metal oxide films in Examples 1-5; FIG. 7 shows X-ray diffraction patterns of the metal oxide films in Examples 6 and 7; and FIG. 8 shows an X-ray diffraction chart of the metal oxide film in Example 8; FIG. 9 shows an X-ray diffraction patterns of the metal oxide film in Comparative Example 1.

It was found that in Examples 1-8 the metal oxide film had sufficient crystal orientation of (100) in their X-ray diffraction patterns. On the other hand, little crystal orientation of (100) was recognized in Comparative Example 1.

What is claimed is:

1. A method of making a metal oxide film, the method comprising:
    a step of forming a metal film having a (111) plane, on a base material;
    a step of directly forming a metal oxide film on the (111) plane of the metal film; and
    a step of maintaining a temperature of the metal oxide film at 300-400° C. and irradiating the metal oxide film with UV light to obtain a crystalline metal oxide film, wherein
    the metal oxide film is $BaTiO_3$ or $(Ba, Sr)TiO_3$,
    the UV light is pulsed laser light having energy of 70-90 mJ/cm$^2$ per pulse,
    the obtained crystalline metal oxide film after the step of maintaining a temperature and irradiating the metal oxide film is orientated to (100) plan;
    a repetition rate of the pulsed laser light is 1-100 Hz, and a number of shots is from 100 to 10,000.

2. The method according to claim 1, wherein a wavelength of the UV light is 100-500 nm.

3. The method according to claim 1, wherein
    the metal oxide is $BaTiO_3$,
    the temperature of the metal oxide film is maintained at 400° C., and
    the UV light is pulsed laser light having energy of 70 mJ/cm$^2$ per pulse.

4. The method according to claim 1, wherein
    the metal oxide is $(Ba, Sr)TiO_3$,
    the temperature of the metal, oxide film is maintained at 300° C., and
    the UV light is pulsed laser light having energy of 80-90 mJ/cm$^2$ per pulse.

5. The method according to claim 1, wherein the metal oxide is $(Ba, Sr)TiO_3$,
    the temperature of the metal oxide film is maintained at 300° C., and
    the UV light is pulsed laser light having energy of 80 mJ/cm$^2$ per pulse or 90 mJ/cm$^2$ per pulse.

* * * * *